(12) United States Patent
Yu et al.

(10) Patent No.: US 10,051,625 B2
(45) Date of Patent: Aug. 14, 2018

(54) COMMUNICATION METHOD AND COMMUNICATION DEVICE IN WIRELESS LAN SYSTEM THAT SUPPORTS MULTI-BANDWIDTH

(71) Applicant: Electronics and Telecommunications Research Institute, Daejeon (KR)

(72) Inventors: Hee Jung Yu, Daejeon (KR); Min Ho Cheong, Daejeon (KR); Jae Seung Lee, Daejeon (KR); Hyoung Jin Kwon, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/406,068

(22) PCT Filed: Jun. 13, 2013

(86) PCT No.: PCT/KR2013/005215
§ 371 (c)(1),
(2) Date: Dec. 5, 2014

(87) PCT Pub. No.: WO2013/187703
PCT Pub. Date: Dec. 19, 2013

(65) Prior Publication Data
US 2015/0173077 A1 Jun. 18, 2015

(30) Foreign Application Priority Data

Jun. 13, 2012 (KR) .................. 10-2012-0063150
Jun. 12, 2013 (KR) .................. 10-2013-0067115

(51) Int. Cl.
| H04W 72/04 | (2009.01) |
| H04L 12/24 | (2006.01) |
| H04W 84/12 | (2009.01) |

(52) U.S. Cl.
CPC ..... *H04W 72/0453* (2013.01); *H04L 41/0803* (2013.01); *H04W 72/048* (2013.01); *H04W 84/12* (2013.01)

(58) Field of Classification Search
CPC ............ H04W 72/0453; H04W 84/12; H04W 72/048; H04L 41/0803
See application file for complete search history.

(56) References Cited

U.S. PATENT DOCUMENTS

| 8,787,338 B2 | 7/2014 | Liu et al. |
| 2008/0080553 A1* | 4/2008 | Hasty .................. H04L 1/0002 370/468 |

(Continued)

FOREIGN PATENT DOCUMENTS

| CN | 102396186 A | 3/2012 |
| KR | 10-2010-0042228 A | 4/2010 |

(Continued)

OTHER PUBLICATIONS

Liwen Chu et al., "80MHz/160MHz Protection", IEEE 802.11-10/1096r7, Sep. 14, 2010, pp. 1-13.

(Continued)

*Primary Examiner* — Hassan Kizou
*Assistant Examiner* — Abdullahi Ahmed

(57) ABSTRACT

Provided is an apparatus and method for communication in a wireless local area network (LAN) system supporting a multi-bandwidth in which a communication apparatus supporting a multi-bandwidth includes generating a base frame based on at least one of a first bandwidth having the lowest signal-to-noise ratio (SNR) among predetermined band- (Continued)

widths and a second bandwidth that is two times greater than the first bandwidth, configuring a duplication mode frame based on the base frame, and transmitting the duplication mode frame through a plurality of bands.

4 Claims, 10 Drawing Sheets

(56) References Cited

U.S. PATENT DOCUMENTS

| | | | |
|---|---|---|---|
| 2009/0016375 A1* | 1/2009 | Hsieh | H04L 5/0007 370/465 |
| 2009/0029710 A1 | 1/2009 | Ochiai et al. | |
| 2009/0109944 A1* | 4/2009 | Kwon | H04W 99/00 370/338 |
| 2009/0311982 A1* | 12/2009 | Zhang | H03J 1/0091 455/161.3 |
| 2011/0028175 A1* | 2/2011 | Chang | G01S 5/02 455/509 |
| 2012/0263141 A1* | 10/2012 | Taghavi Nasrabadi | H04W 72/02 370/330 |
| 2013/0051260 A1* | 2/2013 | Liu | H04L 43/0805 370/252 |
| 2013/0107829 A1* | 5/2013 | Shao | H04W 72/02 370/329 |
| 2013/0107833 A1* | 5/2013 | Liu | H04W 72/082 370/329 |
| 2013/0235714 A1* | 9/2013 | Azizi | H04L 69/22 370/208 |
| 2013/0315163 A1* | 11/2013 | Zhang | H04L 5/001 370/329 |
| 2013/0329815 A1* | 12/2013 | Kenney | H04B 1/14 375/259 |

FOREIGN PATENT DOCUMENTS

| | | |
|---|---|---|
| KR | 10-2010-0053695 A | 5/2010 |
| KR | 10-2011-0034317 A | 4/2011 |
| WO | WO 2012/040495 A1 | 3/2012 |
| WO | WO 2012/051319 A1 | 4/2012 |

OTHER PUBLICATIONS

International Search Report for PCT/KR2013/005215 filed Jun. 13, 2013.

* cited by examiner

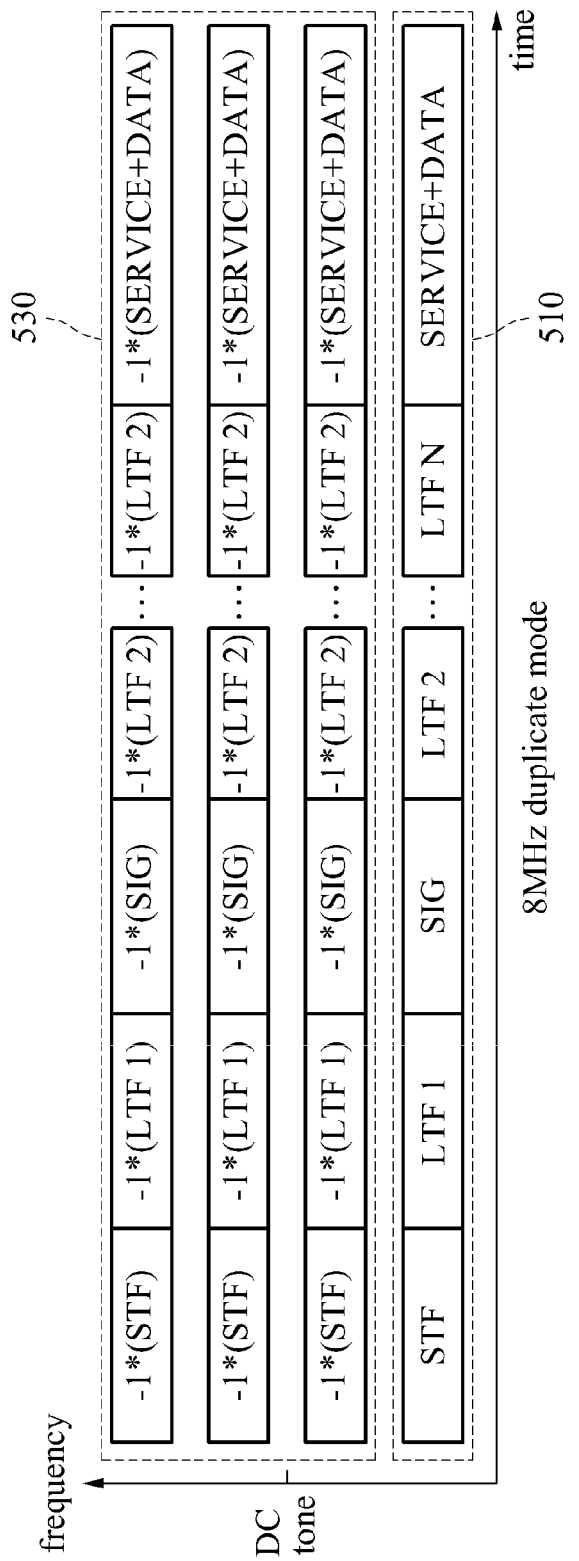

NDP type short CTS

4MHz duplicate NDP type short CTS

8MHz duplicate NDP type short CTS

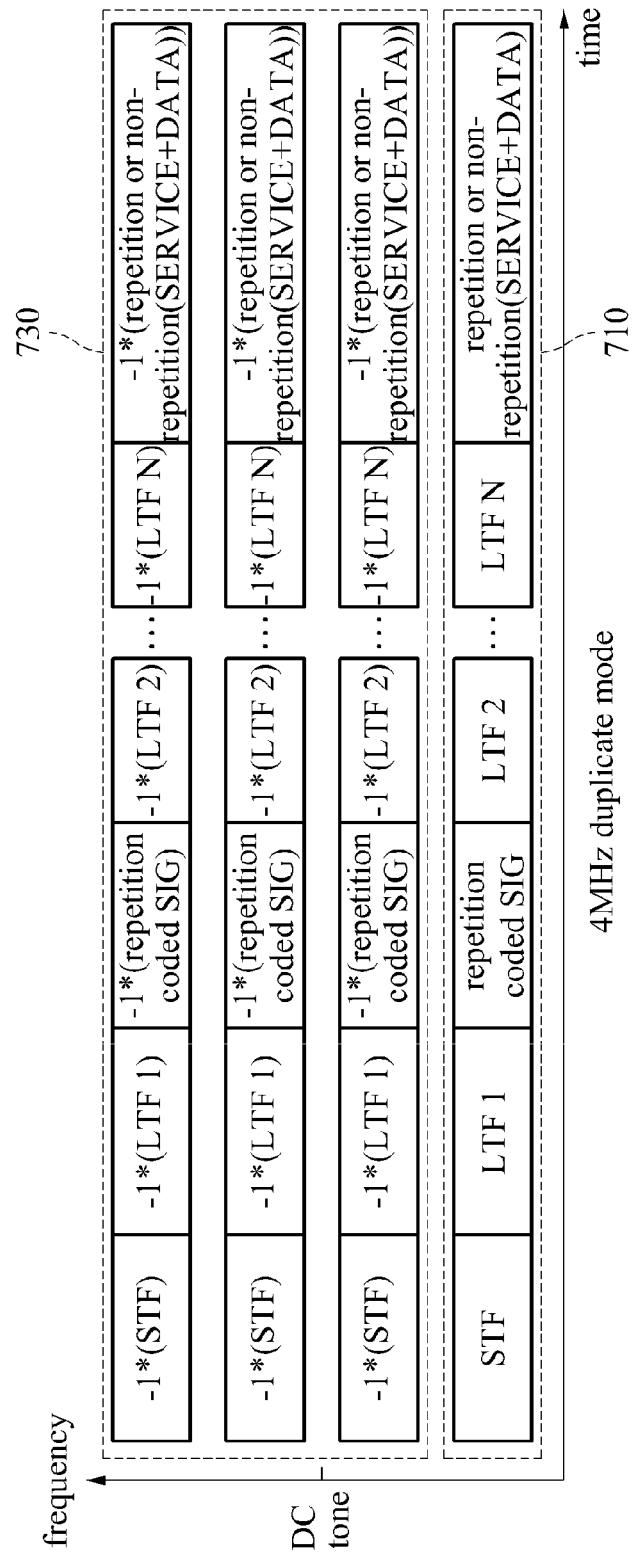

COMMUNICATION METHOD AND COMMUNICATION DEVICE IN WIRELESS LAN SYSTEM THAT SUPPORTS MULTI-BANDWIDTH

TECHNICAL FIELD

The present invention relates to an apparatus and method for communication in a wireless local area network (WLAN) system supporting a multi-bandwidth.

BACKGROUND ART

In general, development of wireless local area network (WLAN) technology has advanced in three directions.

One direction indicates technology for improving a transmission rate and includes WLAN technology using a 60 gigahertz (GHz) band and WLAN technology using a 5 GHz band. Another direction indicates wideband WLAN technology using a frequency band under 1 GHz to extend coverage when compared to existing WLAN technology, and still another direction indicates technology for reducing link set-up time of a WLAN system.

Wideband WLAN technology supports a multi-bandwidth. In a wireless communication system supporting a multi-bandwidth, definition of a bandwidth duplication mode covering an entire communication range of an access point (AP), and in which all terminals supporting various bandwidths may perform reception is required.

DISCLOSURE OF INVENTION

Technical Goals

An aspect of the present invention provides a configuration of a duplication mode frame that may be received by all terminals of a network in a wideband wireless local area network (WLAN) system.

Another aspect of the present invention also provides a method of generating a duplication mode frame based on a bandwidth having the lowest signal-to-noise ratio (SNR) among a plurality of available bandwidths in a wideband WLAN system.

Another aspect of the present invention also provides a method of configuring and transmitting a duplication mode frame suitable for a wideband WLAN system.

Another aspect of the present invention also provides a communication apparatus and method through which a control frame may be received in any bandwidth and at any communication distance of a wideband WLAN system.

Technical Solutions

According to an aspect of the present invention, there is provided a communication method of a wideband wireless local area network (WLAN) system, the method including generating, by a communication apparatus of a network supporting a multi-bandwidth, a base frame based on at least one of a first bandwidth having the lowest signal-to-noise ratio (SNR) among predetermined bandwidths and a second bandwidth that is two times greater than the first bandwidth, configuring a duplication mode frame based on the base frame, and transmitting the duplication mode frame through a plurality of bands.

According to another aspect of the present invention, there is provided a communication apparatus of a wideband WLAN system, the apparatus including a base frame generator to generate a base frame based on any one of a first bandwidth having the lowest SNR among predetermined bandwidths and a second bandwidth that is two times greater than the first bandwidth, a duplication mode frame configurator to configure a duplication mode frame based on the base frame, and a frame transmitter to transmit the duplication mode frame, through a plurality of bands, to a network supporting a multi-bandwidth.

The communication apparatus may select the first bandwidth or the second bandwidth based on types of terminals included in the network or distances from the terminals.

The bandwidth selection may be performed based on at least one of a number of terminals using the first bandwidth, a distance from the communication apparatus, and coverage of the communication apparatus.

Terminals included in the network may demodulate both a base frame generated based on the first bandwidth and a base frame generated based on the second bandwidth.

The duplication mode frame may include a base frame and a duplication frame having a phase different from a phase of the base frame, and the base frame may include a short training field (STF), a long training field (LTF), and a repetition coded signal (SIG) field.

The transmitting may include transmitting the base frame through a first band and simultaneously transmitting the duplication frame through a second band.

The multi-bandwidth may include 1 megahertz (MHz), 2 MHz, 4 MHz, 8 MHz, and 16 MHz.

A frame structure of the first bandwidth may be configured in a form in which information associated with the multi-bandwidth is omitted, and a base frame generated based on the first bandwidth may include information associated with the multi-bandwidth in a signal field or a service field.

Effect of the Invention

According to embodiments of the present invention, it is possible to use a frame structure of a duplication mode based on a 1 megahertz (MHz) unit and a frame structure of a duplication mode based on a 2 MHz unit for transmission of a control frame in a wideband wireless local area network (WLAN) system supporting a multi-bandwidth.

According to embodiments of the present invention, configuring a wideband WLAN system ensuring a dynamic bandwidth allocation and supporting a wider coverage is possible.

According to embodiments of the present invention, a structure of a duplication mode frame and a duplication mode frame transmission method may be applied to a wideband WLAN system supporting a wider coverage.

BRIEF DESCRIPTION OF DRAWINGS

FIGS. 5A and 5B are diagrams illustrating examples of configuring a duplication mode frame according to an embodiment of the present invention.

FIGS. 7A and 7B are diagrams illustrating examples of configuring a duplication mode frame according to another embodiment of the present invention.

BEST MODE FOR CARRYING OUT THE INVENTION

Hereinafter, embodiments will be described in detail with reference to the accompanying drawings.

Figure 1:
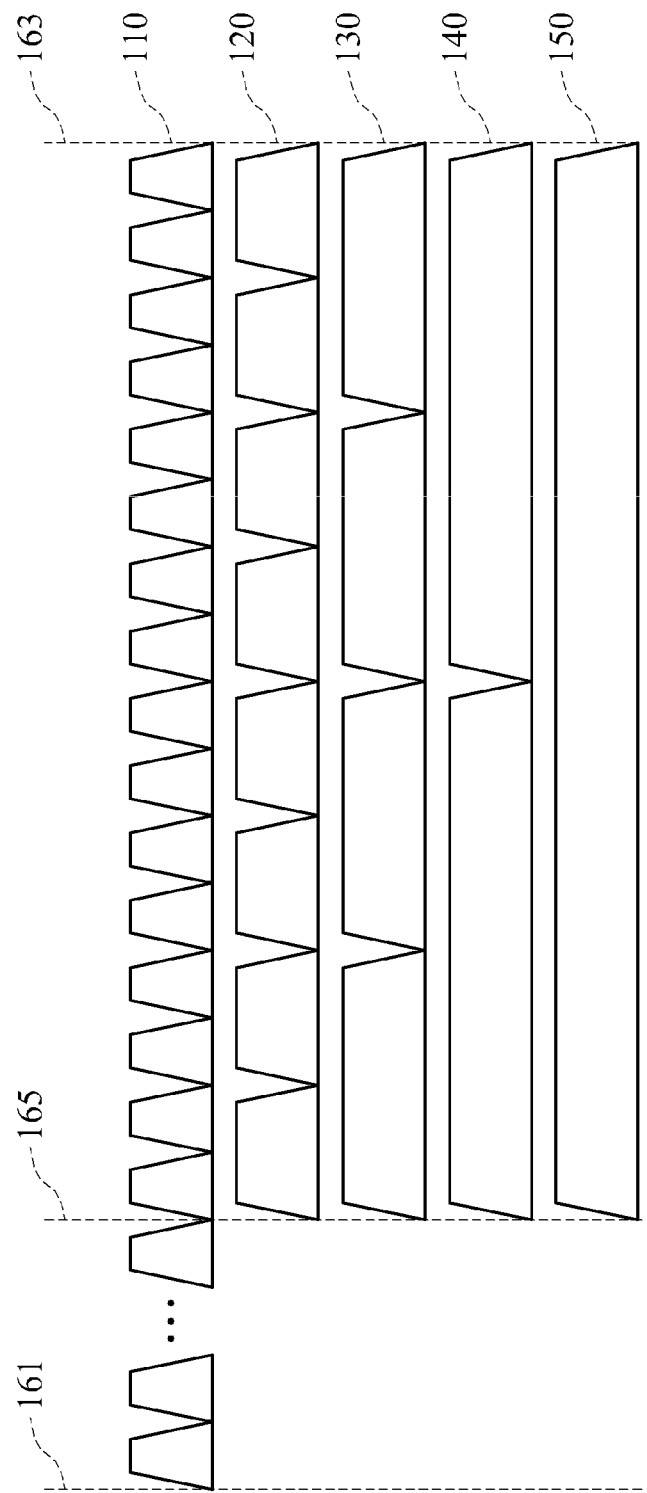
FIG. 1 is a diagram illustrating a multi-bandwidth of a wideband wireless local area network (WLAN) system.

FIG. 1 is a diagram illustrating a multi-bandwidth of a wideband wireless local area network (WLAN) system.

A wideband WLAN system, for example, a WLAN system defined in the Institute of Electrical and Electronics Engineers (IEEE) 802.11ah standard, may support a multi-bandwidth. The multi-bandwidth may include a first bandwidth having a lowest signal-to-noise ratio (SNR) and a second bandwidth that is two times greater than the first bandwidth. In this instance, a value of the first bandwidth may be 1 megahertz (MHz).

Referring to FIG. 1, the multi-bandwidth may include a 1 MHz bandwidth 110, a 2 MHz bandwidth 120, a 4 MHz bandwidth 130, an 8 MHz bandwidth 140, and a 16 MHz bandwidth 150. A frequency band of the wideband WLAN system may be less than or equal to 1 gigahertz (GHz).

Accordingly, "the multi-bandwidth may be expressed to include 1 MHz, 2 MHz, 4 MHz, 8 MHz, and 16 MHz".

In FIG. 1, a frequency lower limit value 161 may be a value between 700 MHz and 920 MHz, and a frequency upper limit value 163 may be a value between 750 MHz and 930 MHz.

As illustrated in FIG. 1, the 1 MHz bandwidth 110 may be allocated throughout an entire channel, and remaining bandwidths, for example, the 2 MHz bandwidth 120, the 4 MHz bandwidth 130, the 8 MHz bandwidth 140, and the 16 MHz bandwidth 150 may be allocated to only a portion of a section of the entire channel.

For example, the 16 MHz bandwidth 150 may be allocated between a predetermined frequency value 165 of FIG. 1 and the frequency upper limit value 163. Referring to FIG. 1, eight channels are allocated to the 2 MHz bandwidth 120, four channels are allocated to the 4 MHz bandwidth 130, and two channels are allocated to the 8 MHz bandwidth 140. However, allocation of channels as illustrated in FIG. 1 is provided only as an example and thus, a number of channels and a frequency band may be configured using a variety of methods.

In the present specification, a transmission mode having a value of the 1 MHz bandwidth 110 is referred to as a 1 MHz mode, and a transmission mode having a value of the 2 MHz bandwidth 120 is referred to as a 2 MHz mode.

The 1 MHz mode may refer to a transmission mode that maintains an orthogonal frequency division multiplexing (OFDM) symbol structure and includes 32 subcarriers. In this instance, the 1 MHz mode may use a frequency domain repetition transmission method and thus, may have the lowest transmission rate among bandwidths. However, in the 1 MHz mode, a signal may be transmitted to the farthest distance since the 1 MHz mode has a low SNR.

In a wideband WLAN system using a frequency band less than 1 GHz, terminals receiving, in full, a signal transmitted in the 1 MHz mode and a signal transmitted in the 2 MHz mode may be necessary.

A WLAN technology using a 5 GHz band discloses a frame structure for dynamic bandwidth allocation. However, applying a packet structure of the WLAN technology using the 5 GHz band directly to the wideband WLAN system using the frequency band less than 1 GHz is difficult. Thus, a frame structure suitable for the frequency band less than 1 GHz is required.

Figure 2:
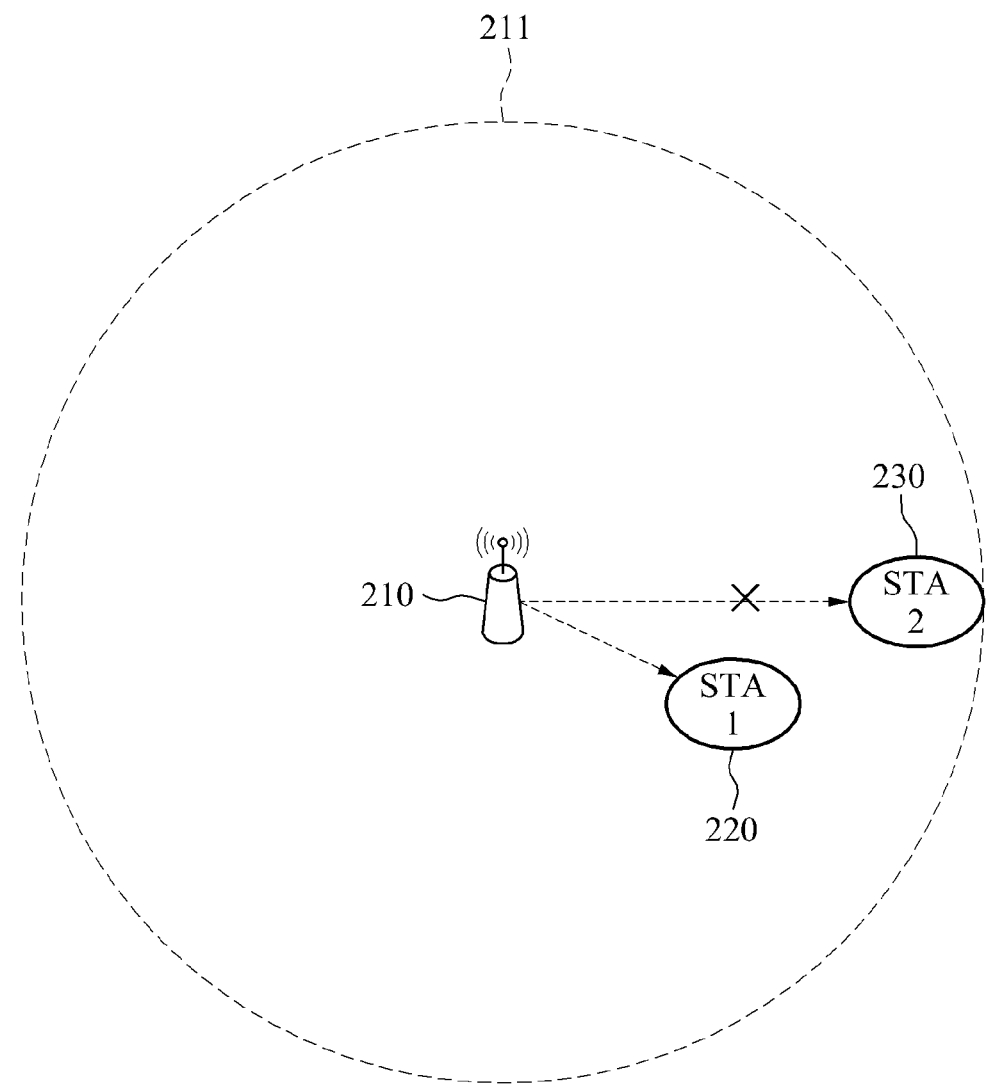
FIG. 2 is a diagram illustrating a base bandwidth selecting method according to an embodiment of the present invention.

FIG. 2 is a diagram illustrating a base bandwidth selecting method according to an embodiment of the present invention.

Referring to FIG. 2, a communication apparatus 210 may be an access point (AP) or a base station. An STA-1 220 and an STA-2 230 are present within coverage 211 of the communication apparatus 210. In this instance, the STA-1 220 and the STA-2 230 may be terminals that receive, in full, a signal transmitted in a 1 MHz mode and a signal transmitted in a 2 MHz mode, thereby demodulating the received signals.

When the communication apparatus 210 transmits a signal using the 2 MHz mode, the STA-1 220 may receive the signal and the STA-2 230 may not receive the signal.

The 1 MHz mode may have the longest signal transmission distance. Thus, when the communication apparatus 210 transmits a signal using the 1 MHz mode, the STA-2 230 may also receive the signal.

Accordingly, both a duplication mode using the 2 MHz mode as a base bandwidth and a duplication mode using the 1 MHz mode as a base bandwidth may be required.

In this instance, a frame transmitted in the duplication mode may be referred to as a duplication mode frame. The duplication mode frame will be further described with reference to FIGS. 3 through 7.

Figure 3:
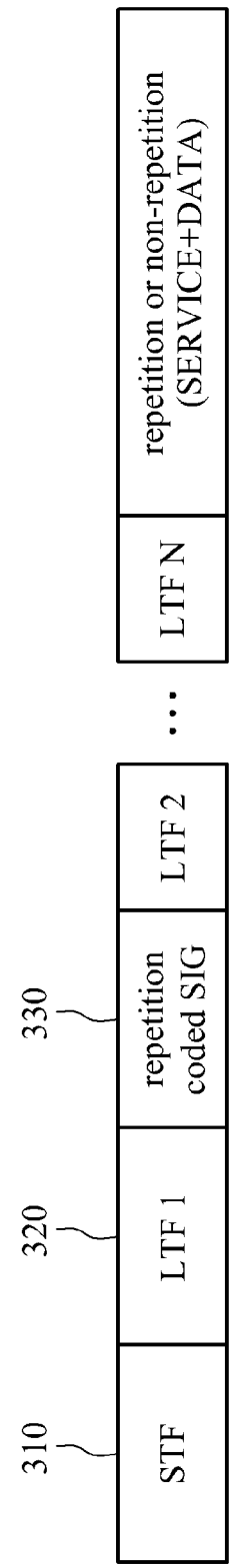
FIG. 3 is a diagram illustrating a frame structure of a first bandwidth of a multi-bandwidth in a wideband WLAN system.

FIG. 3 is a diagram illustrating a frame structure of a first bandwidth of a multi-bandwidth in a wideband WLAN system.

Figure 4:
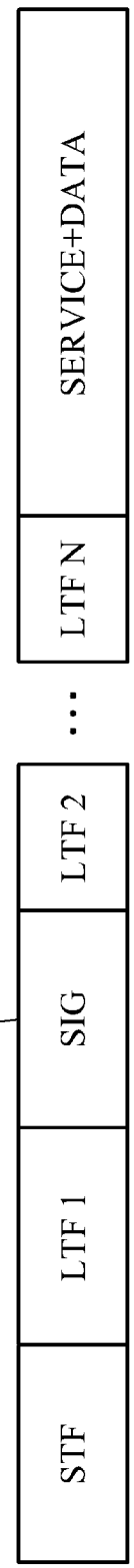
FIG. 4 is a diagram illustrating a frame structure of a second bandwidth of a multi-bandwidth in a wideband WLAN system.

FIG. 4 is a diagram illustrating a frame structure of a second bandwidth of a multi-bandwidth in a wideband WLAN system.

In this instance, a first bandwidth may be 1 MHz and a second bandwidth may be 2 MHz.

Referring to FIG. 3, a 1 MHz mode frame may include a short training field (STF) 310, a long training field (LTF) 320, and a repetition coded signal (SIG) field 330.

An SIG field 410 of a 2 MHz mode frame may include a total of 48 bits of information including nine bits of length information, four bits of modulation and coding scheme (MCS) information, and two bits of information associated with a bandwidth. The SIG field 330 of the 1 MHz mode frame may be provided in a structure in which information associated with a bandwidth is omitted, and may include 36 bits of information.

A variety of methods may be used to configure the duplication mode frame using the 1 MHz mode frame and the 2 MHz mode frame.

Here, a method of configuring a duplication mode frame based on a 2 MHz mode frame will be described with reference to FIGS. 5A through 6C, and a method of configuring a duplication mode frame based on a 1 MHz mode frame will be described with reference to FIG. 7.

Figure 5A:
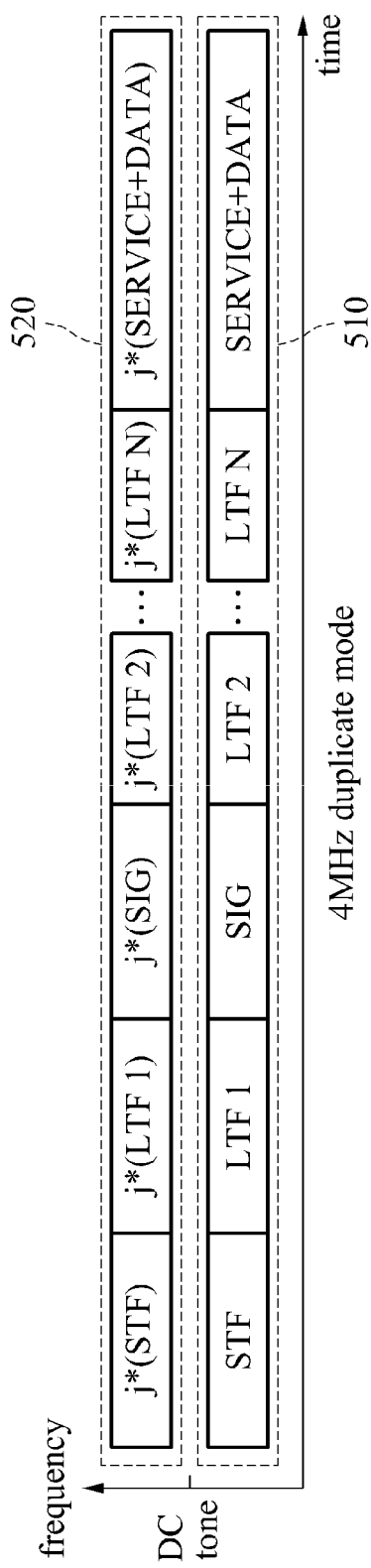

FIGS. 5A and 5B are diagrams illustrating examples of configuring a duplication mode frame according to an embodiment of the present invention.

FIG. 5A illustrates a 4 MHz duplication mode frame.

In this instance, the 4 MHz duplication mode frame may include a base frame 510 and a duplication frame 520 having a phase different from a phase of the base frame 510 by 90 degrees (°). Referring to FIG. 5A, a duplication mode frame may be performed by transmitting a frame and then shifting a phase of the same frame by 90° based on a direct current (DC) tone and transmitting the phase-shifted frame, through two bands, respectively.

For example, a process of transmitting the duplication mode frame may include an operation of transmitting a base frame through a first band and simultaneously transmitting a duplication frame through a second band.

Accordingly, a receiver receiving a duplication mode frame may perform demodulation by receiving a frame received from any one of the first band and the second band.

The base frame 510 of FIG. 5 may be provided in a same structure as a structure of the 2 MHz mode frame of FIG. 4. Thus, the base frame 510 may include an STF, an LTF, and an SIG field.

FIG. 5B illustrates an 8 MHz duplication mode frame.

The 8 MHz duplication mode frame may include a base frame 510 and three duplication frames 530 having a phase different from a phase of the base frame 510 by 180°.

Four frames included in the 8 MHz duplication mode frame may be simultaneously transmitted through four separate bandwidths.

Accordingly, a receiver configured to receive a duplication mode frame may perform demodulation or detection even though only one frame is received among the aforementioned four frames.

Although not illustrated in FIGS. 5A and 5B, a 16 MHz duplication mode frame may be provided in a structure in which the 8 MHz duplication mode frame is repeated twice on a frequency axis.

The structure of the duplication mode frame illustrated in FIGS. 5A and 5B may be used to transmit a request to send (RTS) message and a "null data packet (NDP) type short clear to send (CTS) message" in which a data portion is not included.

Figure 6A:
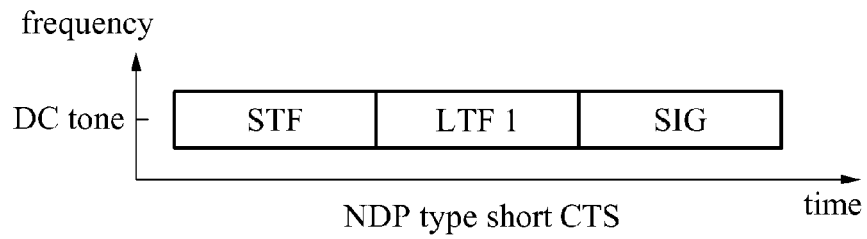
FIGS. 6A through 6C are diagrams illustrating a structure of a duplication mode frame of a null data packet (NDP) type short clear to send (CTS) message.
Figure 6B:
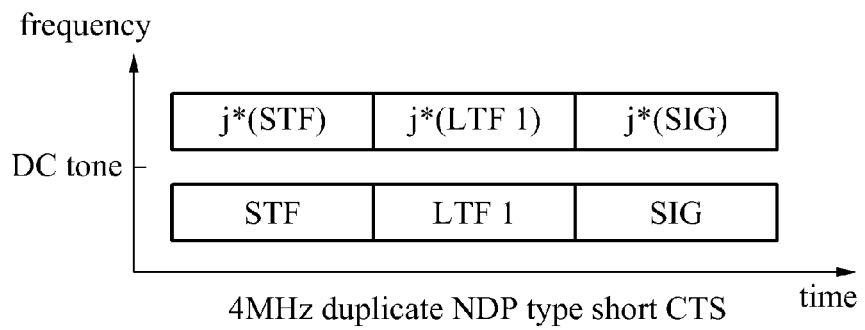
Figure 6C:
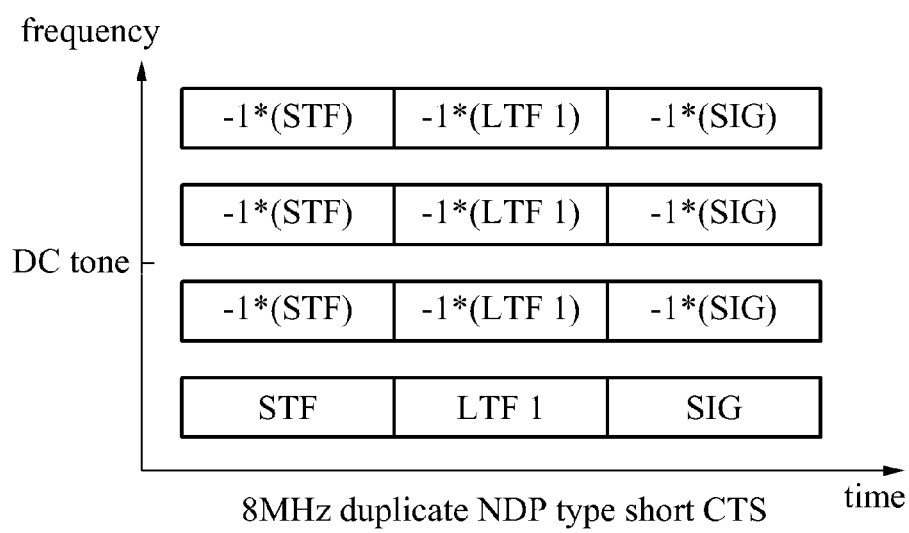

FIGS. 6A through 6C are diagrams illustrating a structure of a duplication mode frame of an NDP type short CTS message.

FIG. 6A illustrates a frame structure of a 2 MHz mode NDP type short CTS message.

FIG. 6B illustrates a frame structure of a 4 MHz duplicate NDP type short CTS message configured based on a 2 MHz bandwidth.

FIG. 6C illustrates a frame structure of a 8 MHz duplicate NDP type short CTS message configured based on a 2 MHz bandwidth.

In examples of FIGS. 6A to 6C, information included in an SIG may differ based on information included in the NDP type short CTS message. For example, information included in the SIG may include a total of 48 bits by including two bits for indicating a using bandwidth.

Based on the 2 MHz bandwidth, control information such as RTS and CTS may be transmitted and received using the duplication mode frame. In this instance, a terminal not receiving a 2 MHz mode signal and may receive a 1 MHz mode signal, such as the STA (2) 230 of FIG. 2, may not perform communication since the terminal may not receive the control information.

Accordingly, configuring a duplication mode using a frame structure used in a 1 MHz mode is required.

Figure 7A:
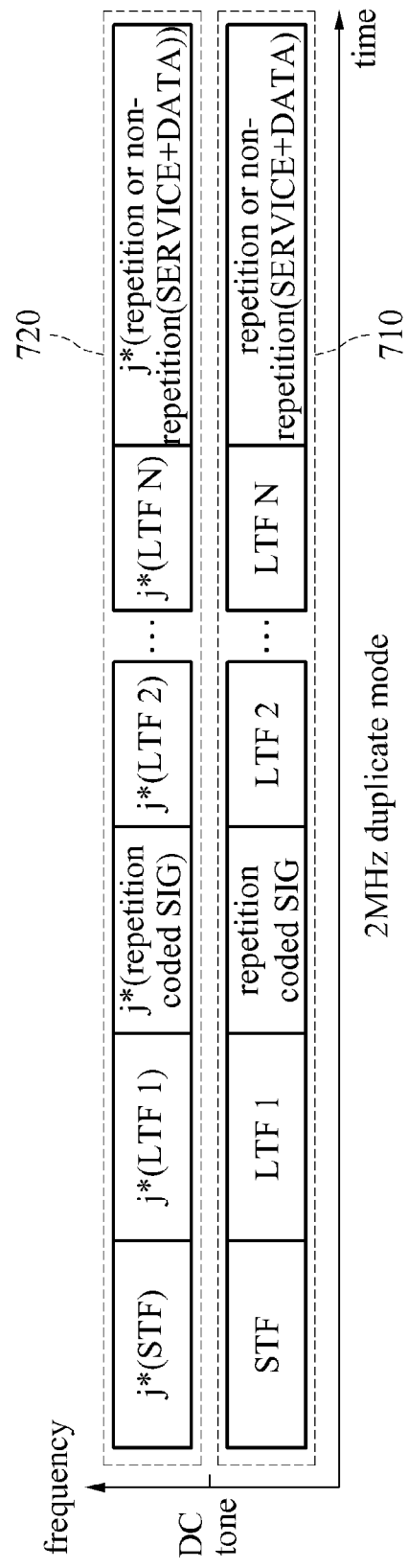

FIGS. 7A and 7B are diagrams illustrating examples of configuring a duplication mode frame according to another embodiment of the present invention.

FIG. 7A illustrates a 2 MHz duplication mode frame.

In this instance, the 2 MHz duplication mode frame may include a base frame 710 and a duplication frame 720 having a phase different from a phase of the base frame 710 by 90°. Referring to FIG. 7A, a duplication mode frame transmission may include an operation of transmitting a frame and then shifting a phase of the transmitted frame by 90° based on a DC tone and transmitting the phase-shifted frame, through two bandwidths, respectively.

A process of transmitting the duplication mode frame may include an operation of transmitting a base frame through a third band while simultaneously transmitting a duplication frame through a fourth band.

Accordingly, a receiver receiving a duplication mode frame may perform demodulation by receiving a frame received from any one of the third band and the fourth band.

The base frame 710 of FIG. 7A may be provided in a same structure as a structure of the 1 MHz mode frame of FIG. 3. Thus, the base frame 710 may include an STF, an LTF, and an SIG field.

As described with reference to FIG. 3, the SIG field of the 1 MHz mode frame may be provided in a structure in which information associated with a bandwidth is omitted.

When the duplication mode frame is configured based on the 1 MHz bandwidth, inserting information defining a bandwidth may be required. For example, bandwidth information may be inserted using a portion of bits among four bits defined as a reserved bit in an SIG. In this instance, the bandwidth information may refer to information associated with a bandwidth of a frequency axis used in the example of FIG. 7A. Also, the bandwidth information may be defined using a portion of lower bits of a scrambler sheet included in a service field.

Three bits may be required to divide a bandwidth into 1 MHz, 2 MHz, 4 MHz, 8 MHz, and 16 MHz and subsequently identify the divided bandwidths.

Accordingly, a frame structure of a first bandwidth may be provided in a structure in which information associated with a multi-bandwidth is omitted, and a base frame generated based on the first bandwidth may include information associated with the multi-bandwidth in a signal field or a service field.

FIG. 7B illustrates a 4 MHz duplication mode frame.

The 4 MHz duplication mode frame may include a base frame 710 and three duplication frames having phases different from a phase of the base frame 710 by 180°.

As illustrated in FIGS. 6A to 6C, an NDP type short CTS message may be generated using a 1 MHz bandwidth as a base unit. In this instance, the NDP type short CTS message may be provided in a form of FIG. 7 excluding fields subsequent to an LTF 2.

Figure 8:
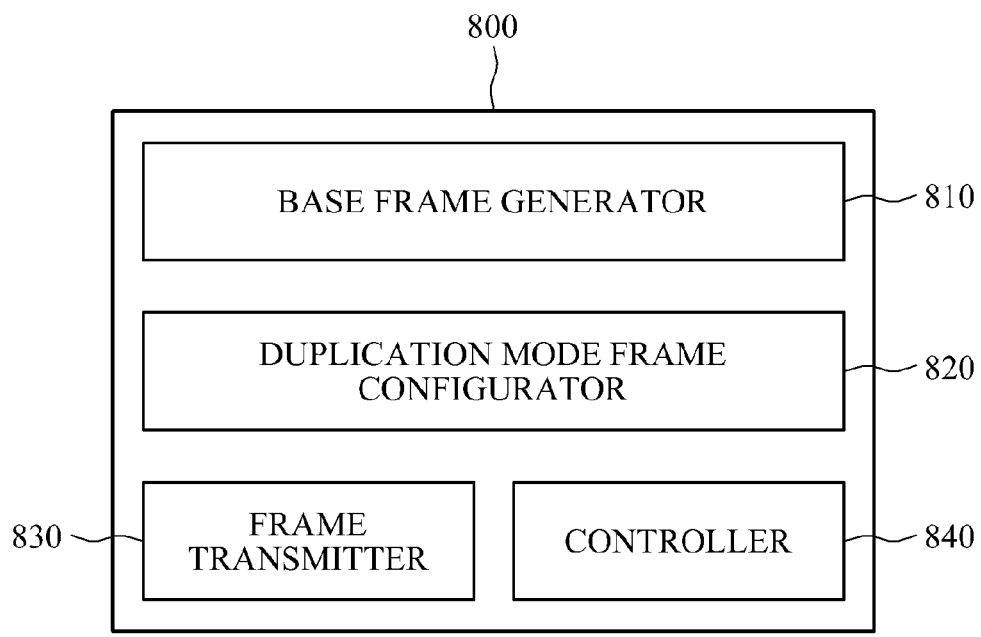
FIG. 8 is a block diagram illustrating a configuration of a communication apparatus of a wideband WLAN system according to an embodiment of the present invention.

FIG. 8 is a block diagram illustrating a configuration of a communication apparatus of a wideband WLAN system according to an embodiment of the present invention.

Referring to FIG. 8, a communication apparatus 800 may include a base frame generator 810, a duplication mode frame configurator 820, and a frame transmitter 830. The communication apparatus 800 may further include a controller 840.

The base frame generator 810 may generate a base frame based on any one of a first bandwidth having the lowest SNR among predetermined bandwidth and a second bandwidth that is two times greater than the first bandwidth.

The base frame generator 810 may select the first bandwidth or the second bandwidth based on types of terminals included in the network or distances from the terminals. For example, the base frame generator 810 may select a bandwidth based on at least one of a number of terminals using the first bandwidth, a distance from the communication apparatus, and coverage of the communication apparatus.

The duplication mode frame configurator 820 may configure a duplication mode frame based on the base frame.

The frame transmitter 830 may transmit the duplication mode frame to a network supporting a multi-bandwidth.

The frame transmitter 830 may simultaneously transmit the base frame through a first band and the duplication frame through a second band.

The communication apparatus 800 may select the first bandwidth or the second bandwidth based on types of terminals included in the network or distances from the terminals. In this instance, the types of terminals may be divided into a terminal capable of receiving a 1 MHz mode signal only and a terminal capable of receiving a 2 MHz mode signal only.

The controller 840 may include at least one processor to control an overall operation of the communication apparatus 800.

The controller 840 may collect information associated with distances from the terminals and receive information associated with distances between an upper apparatus and the terminals by signaling with the terminals in the network. Also, the controller 840 may determine whether to transmit the duplication mode frame based on the 1 MHz bandwidth or to transmit the duplication mode frame based on the 2 MHz bandwidth.

For example, when at least a predetermined number of terminals use the 1 MHz bandwidth or many terminals exist at a predetermined distance or farther, the controller 840 may control the communication apparatus 800 to transmit the duplication mode frame using the 1 MHz bandwidth as a base unit.

In addition, when cell coverage has a radius less than a predetermined radius, the controller 840 may control the communication apparatus 800 to transmit the duplication mode frame using the 2 MHz bandwidth as a base unit. In this instance, when the duplication mode frame is transmitted using the 2 MHz bandwidth as a base unit, an air time of a control frame may be decreased and an entire efficiency of the network may be increased.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication method by a communication apparatus in a wireless local area network (WLAN) system, the method comprising:
   determining whether a frequency domain repetition is applied to a physical frame;
   when the frequency domain repetition is applied to the physical frame, generating the physical frame including a plurality of time domain fields, wherein the frequency domain repetition is applied to a first part of the plurality of time domain fields without being applied to a second part of the plurality of time domain fields, the second part being different from the first part; and
   transmitting the physical frame,
   wherein the frequency domain repetition includes mapping same information to a lower half of frequency subcarriers and an upper half of the frequency subcarriers, and
   wherein a phase applied to information mapped to the lower half of the frequency subcarriers of the first part of the plurality of time domain fields is different from a phase applied to information mapped to the upper half of the frequency subcarriers of the first part of the plurality of time domain fields.

2. The method of claim 1,
   wherein the plurality of time domain fields includes a short training field (STF), a long training field (LTF), a signal (SIG) field, and a Data field.

3. The method of claim 2,
   wherein the first part of the plurality of time domain fields includes the SIG field and the Data field, and the second part of the plurality of time domain fields includes the STF and the LTF.

4. A communication apparatus in a wireless local area network (WLAN) system, the apparatus comprising:
   a processor; and
   a transmitter,
   wherein the processor is configured to:
   determine whether a frequency domain repetition is applied to a physical frame;
   when the frequency domain repetition is applied to the physical frame, generate the physical frame including a plurality of time domain fields, wherein the frequency domain repetition is applied to a first part of the plurality of time domain fields without being applied to a second part of the plurality of time domain fields, the second part being different from the first part; and
   cause the transmitter to transmit the physical frame,
   wherein the frequency domain repetition includes mapping same information to a lower half of frequency subcarriers and an upper half of the frequency subcarriers, and
   wherein a phase applied to information mapped to the lower half of the frequency subcarriers of the first part of the plurality of time domain fields is different from a phase applied to information mapped to the upper half of the frequency subcarriers of the first part of the plurality of time domain fields.

\* \* \* \* \*